Sept. 17, 1940. W. G. BETZ Re. 21,567
PIANO ACTION
Original Filed July 28, 1936 2 Sheets-Sheet 1
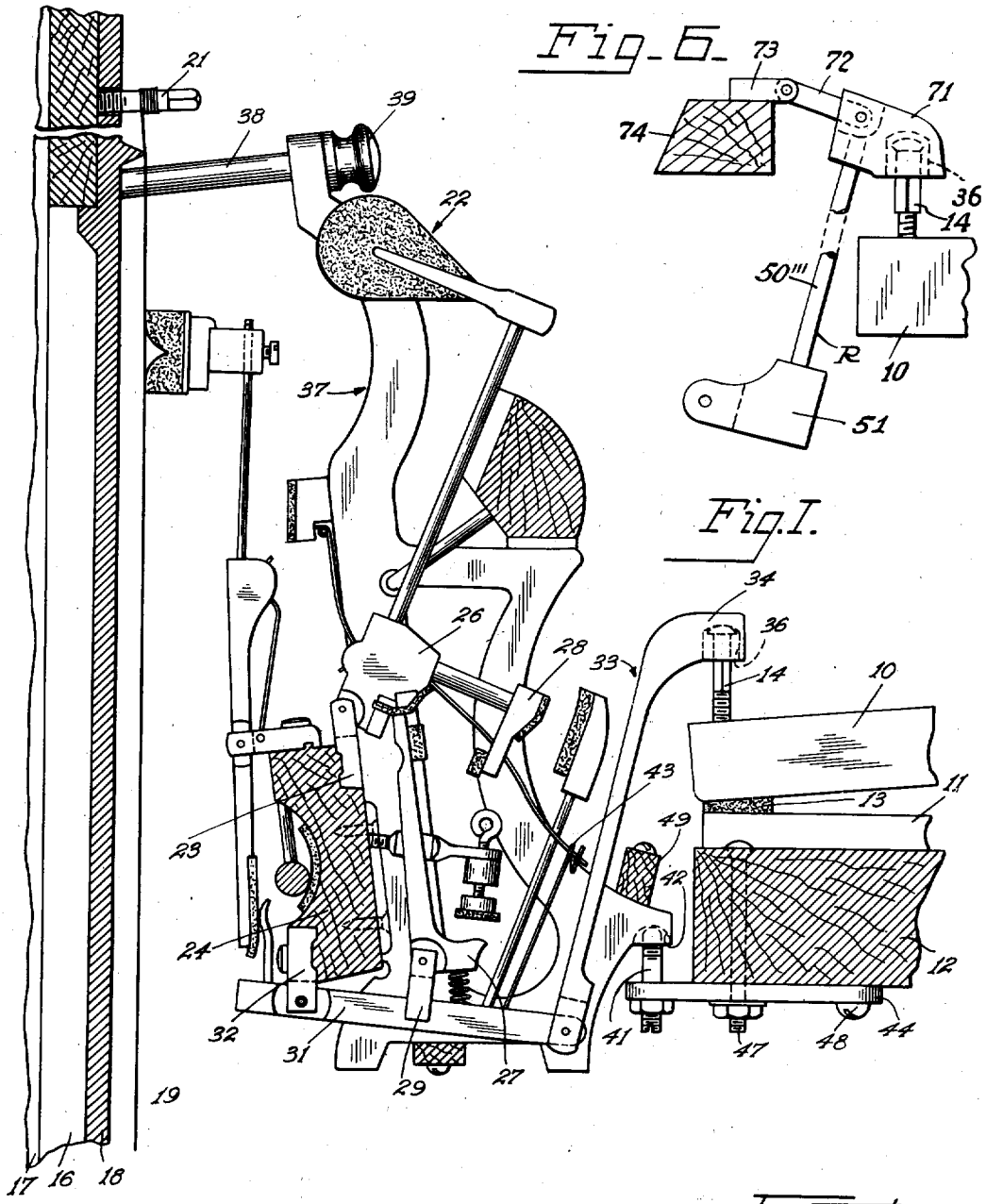
Inventor:
William G. Betz
By Sooman L. Mueller
Atty Sept. 17, 1940. W. G. BETZ Re. 21,567
PIANO ACTION
Original Filed July 28, 1936 2 Sheets-Sheet 2.
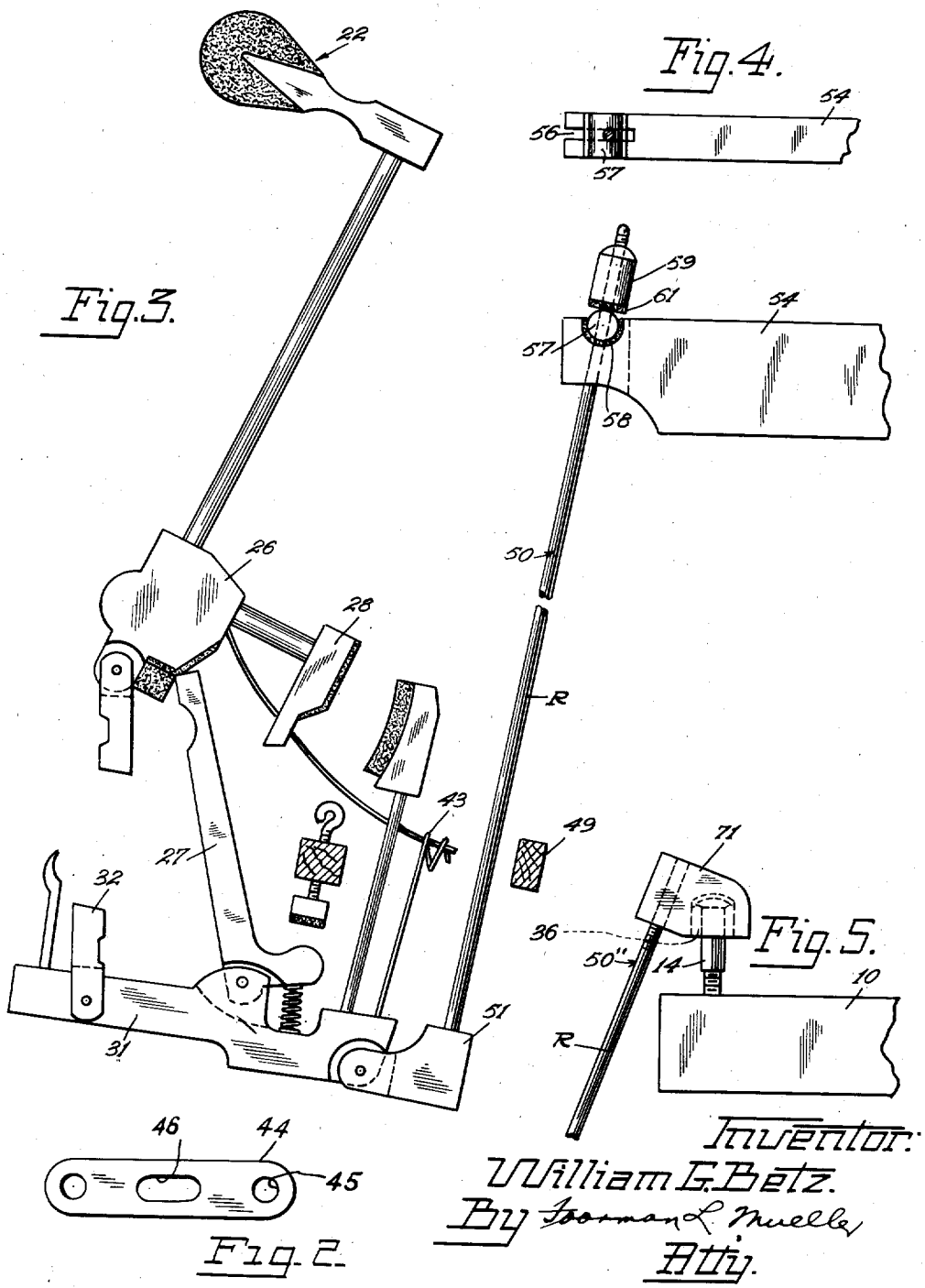

Reissued Sept. 17, 1940

Re. 21,567

UNITED STATES PATENT OFFICE 21,567

PIANO ACTION

William G. Betz, New York, N. Y., assignor to Pratt, Read & Company, Inc., Ivoryton, Conn., a corporation of Connecticut Original No. 2,156,961, dated May 2, 1939, Serial No. 93,040, July 28, 1936. Application for reissue April 27, 1940, Serial No. 332,122

14 Claims. (Cl. 84—240)

My invention relates in general to piano actions, and in particular to an action for a small upright piano standing substantially as high as the ordinary grand piano, but having a keyboard at the usual height.

The small upright piano standing in general no higher than the top of the usual grand piano, has become popular because of the smaller space that it occupies, in contrast to the old type upright, and because of a more decorative and pleasing appearance than the old style. The keyboard, of course, is maintained at substantially the standard height from the floor and with the top of the piano standing no higher than the usual grand piano, a large part of the upright action is below the keyboard line. This type of piano has introduced new problems in action construction as well as the mounting of the action.

In the actions now employed in this type of piano, a somewhat complicated action is utilized with multi-piece abstract mechanism linking the remainder of the action to the key, and with an expensive mounting construction. In providing a multi-piece abstract, the possibility of friction between various members is increased, and in actions employed at the present time the capstan on each individual key of the keyboard does not strike the main member of the abstract directly but strikes one of the numerous pieces employed to connect the abstract into the piano action. One result of this is that the force exerted by the key is divided between the abstract and the support member. With the objectionable friction and this indirect contact between the key and the abstract, sensitivity and efficiency of the piano action have been materially reduced. Furthermore, mounting the actions now employed is a difficult problem, and the abstract mounting interferes with removal or assembly of the keys. These factors result in a costly assembly operation for the entire piano.

It is an object of my invention to provide an improved piano action designed primarily for a small upright piano.

A further object is to provide a simplified and inexpensive action for such a piano structure.

A still further object is to provide an action for a small upright piano with relatively few parts, so as to simplify assembly of the action and reduce friction in the same, particularly between the hammer operating mechanism and the key.

A still further object is to provide an improved and simplified mounting for said piano action.

Other objects and advantages of my invention will be apparent from the following description, taken with the drawings, in which:

Fig. 1 is a side elevation of my piano action with portions in cross section, and showing only fragments of some of the portions of the piano structure itself.

Fig. 2 is a detail view of a mounting plate used for the action.

Fig. 3 is a fragmentary showing of a modified embodiment of my invention, some parts being omitted for simplicity.

Fig. 4 is a fragmentary plan view of a portion of the structure shown in Fig. 3.

Fig. 5 is a fragmentary view showing still another modification of the invention.

Fig. 6 is an illustration in elevation of a further modification of my invention. This structure includes an abstract having a supported head, with the latter conforming to that of Fig. 5, and the abstract rod of Figs. 3 and 5, in combination with the abstract mounting member of Fig. 3.

In practicing my invention I provide an action for a piano having the usual keyboard and a capstan screw or other connecting arrangement at the rear end of each of the keys. The action is employed primarily for use with a low upright piano, and is secured to a mounting bracket which in turn is carried on the back and key bed for the piano. The action includes an abstract pivotally secured on a pivoted whip with an overhanging lip or head centered over the rear end of the key structure and adapted to be struck directly by said key structure upon operation of the key. A two-point suspension for the brackets for the piano actions is provided, with said brackets secured to the back at the top in the usual manner and adjustably supported on a mounting plate which in turn is secured to the key bed of the piano.

The low upright piano in which my action is employed includes the usual key 10 mounted on a key frame 11 which is in turn rigidly secured to a key bed 12. A felt cushion 13 is secured between the key and key frame, and in the Fig. 1 form of the invention a capstan screw 14 is secured into the top and end of each key 10. It is understood, of course, that I am illustrating the mechanism simply for a single key in the complete action comprising the usual keyboard, and that a similar action is provided for each key throughout the piano. A sounding board 16 is mounted on the back 17 of the piano, and a plate 18 is mounted in the usual manner upon the sounding board. Each string 19 is suspended in the usual manner from a tuning pin 21.

My invention is directed primarily to the abstract and to the mounting means for the action and may be adapted to the usual remaining portions of the action, including the hammer 22, pivotally supported from a butt flange 23 which in turn is mounted on a hammer rest rail 24. The hammer butt 26 is so constructed as to rest on the pivoted jack 27, with the movement of the hammer being limited by the hammer check 28. The jack 27 is pivoted on a jack support 29 carried on a whip 31 which in turn is pivotally supported on a whip flange 32.

The movement of the key 10 is transmitted to the hammer 22 by means including the jack 27, whip 31, capstan 14, and an intermediate member known as an abstract and indicated by the reference character 33. In providing an action for a small upright piano, or in fact any piano, it is important to consider not only the operating mechanism itself as to operation, cost and the like, but it is also important to construct the action in such a way as to facilitate the assembly of the action in the piano as a whole.

In my one-piece abstract 33 a forwardly extending enlarged head 34 is provided, having a cavity 36 therein fitting the capstan screw 14 to originally center the abstract and its connecting elements in the action with respect to the key for which it is employed, and then to maintain the abstract centered during the operation of the piano. The abstract may be raised to clear the capstan 14 so that the key may be readily pulled forward or in fact the entire keyboard pulled forward on the key frame. Inasmuch as the capstan 14 is adjustable, this may be raised or lowered to the desired height to properly strike the abstract. With the enlarged head 34 and a centering cavity therein, the capstan strikes directly against the one-piece abstract which in turn transmits the motion of the key directly through the whip 31 and jack 27 to the hammer.

To facilitate insertion of the piano action assembly (including all of the actions) and provide an extremely simplified and sturdy mounting, I employ a metal bracket 37 carried on a bracket bolt 38 extending through the sounding board and then into the piano back, and secured thereon by a bracket nut 39. The bracket is mounted in a two-point suspension to the back of the piano, and at a bolt 41 having a rounded head fitting into a corresponding cavity 42 in the forward edge of a front leg 43 of the bracket. The bolt 41 in turn is adjustably supported in a mounting plate 44 (Fig. 2) which in turn is adjustably secured to the key bed 12. The mounting plate has an elongated hole 46 for pivoting and sliding on a positioning and securing bolt 47 for said plate. When the plate is properly positioned, a bolt or screw 48 may be inserted through aperture 45 into the key bed 12. This type of mounting provides a very rigid support for the piano actions and at the same time permits an accurate leveling and alinement thereof as desired. The mounting bracket 37 itself is simplified over the brackets now in general use, and is provided at a lower cost in a sturdier structure.

To prevent the abstracts from falling forward before the action assembly is installed, during installation and whenever not held in place by the keyboard, a guard rail 49 is mounted on the front leg 43 of the mounting bracket.

A modification of my invention is illustrated in Figs. 3 and 4. The parts have been illustrated with the action and hammer dropped to a lower position with respect to the keys, thus illustrating the flexibility of this type of action with respect to positioning. It should be understood, however, that the action would be supported in a manner similar to that illustrated in Fig. 1 and in fact that the dimensions could be changed slightly so that the action could be supported directly on the hammer rest rail 24 and brackets 37 of Fig. 1. In place of the abstract 33 there is provided an abstract 50, which functions as a one-piece member and is extremely economical to manufacture in that it comprises a wire connecting rod R screwed into a pivoted member 51 and having a simplified and advantageous connection with the key 54. The key 54 is provided at its rear end with a slot 56, through which the abstract 50 passes. The abstract rod also passes through a pin 57, which is shaped to rest in a grove 58 formed in the upper side of the end of the key 54. The groove 58 is, of course, suitably padded with felt. Adjustably securing the pin 57 on the abstract 50 is an adjustable screw cap or nut 59, which is padded at its bottom with felt 61.

It is evident from the foregoing that when the key 54 is depressed, raising the rear end of the key, the abstract 50 is raised, thus raising the whip 31 and jack 27 to pivot the hammer butt 26 and cause a hammer 22 to strike the piano wires associated therewith. It is also evident that the abstract may be adjusted to properly engage the key merely by turning the nut 59 and furthermore that the abstract 50 and pin 57 thereon may be raised slightly to permit removal of the key 54.

It may be noted at this point that the abstracts 33 and 50 are quite similar in that they function as one piece without any friction within themselves, they directly engage the key structure, and they may simply be lifted off of the key to permit removal of the same. Furthermore, they are peculiar in that they have no direct support from fixed frame members, i. e. they are supported only by other parts of the action and by the key, and are supported only by the key at their upper ends. Of course, if it is desired to support the abstract directly from a stationary part, this can be done while at the same time retaining some of the advantages of the illustrated structure, particularly the advantage of ready removability of the keys, by extending a link rearwardly and slightly upwardly from the upper end of the abstract to a fixed member supported by brackets 37 as shown in Fig. 6.

In Fig. 5 is shown a modification embodying most of the advantages of all of the other forms of the invention. At the upper end of the wire rod R identical with the rod in the modification of Figs. 3 and 4 forming the main part of the abstract 50'' is positioned a head 71 which engages the capstan screw 14 as in Fig. 1. The head 71 is provided with a cavity 36 having a felt pad at its inner end on which the capstan screw 14 bears. This form combines the simple key construction including the capstan screw with an inexpensive abstract construction functioning as one piece and having a self centering engagement with the capstan screw.

The illustration of Fig. 6 shows an abstract 50''', including the head 71 of Fig. 5, and the rod R therefor, in combination with the mounting pivot member 51 on the bottom of the rod R exactly as shown in Fig. 3. A link 72 extending rearwardly and slightly upwardly from the upper end of the abstract or directly from the head 71 is pivotally secured to said head and to a fixed member 73 mounted upon a rail 74 which may in turn be secured to the brackets 37, as previously suggested.

It is thus seen that I provide in various forms a simplified action which will transmit motion from the key to the hammer with the maximum efficiency. The action assembly may be quickly and securely mounted in the piano by means of the simplified mounting structure including the bracket, mounting plate, and adjusting bolts. No part of the action obstructs insertion or removal of the keys.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. In an upright piano including the usual keyboard and key bed therefor, and an upright sounding board on the back of said piano, an action for said piano, and means for mounting said action, said means including a mounting bolt extending forwardly from the sounding board, a mounting plate supported on said key bed, extending rearwardly therefrom, and a bracket for said action supported from said mounting bolt and said mounting plate.

2. In an action for a piano having the usual keyboard with a plurality of keys having a capstan on the rear end of each key, a pivoted whip, an abstract pivotably supported on said whip adapted to be engaged by said capstan, and means for maintaining said abstract centered with respect to said capstan, said means including an enlarged head on said abstract having a cavity therein of slightly larger cross section than the cross section of the head of the capstan, with said cavity fitting over said capstan.

3. In an action for a piano having the usual keyboard with a plurality of keys having a capstan on the rear end of each key, a pivoted whip, and an abstract pivotably supported on said whip having an integral overhanging lip, above said capstan to be engaged directly by said capstan upon movement of the key.

4. A piano action for a low level type of upright piano having a plurality of keys, with an action for each, and such action including a hammer and means for actuating said hammer, said means including an abstract having a downwardly extending connecting portion rearwardly of the rear end of a key and an abstract head on the connecting portion and non-pivotal with respect thereto, with said head having a portion overhanging the rear end of the key for striking attack by the key to lift the abstract head to transmit the motion of the key by means of the abstract.

5. In an action for a piano having the usual keyboard with a plurality of keys and a capstan on the end of each key, a pivoted whip, an abstract pivotally supported on said whip having a substantially vertical portion and an enlarged head thereon rigid with respect to the substantially vertical portion, with said enlarged head extending from a position to the rear of the rear end of a key and overhanging the capstan on the end of the key in a position to be engaged directly by said capstan, and means at said head for maintaining said abstract head centered with respect to said key.

6. In an action for a low-type upright piano having the usual keyboard with a plurality of keys, a pivoted whip, and an abstract for moving said whip pivotally connected therewith having a substantially vertically extending portion rearwardly of the rear end of the keys when the action is mounted in the piano and having an enlarged head non-rotatably secured to said substantially vertically extending portion, with said head having an integral key engagement portion overhanging the rear end of the key for striking engagement by the key upon movement thereof and with said head adapted to be centered with respect to the rear end of the key.

7. In an upright piano having a keyboard, a key bed therefor, an action, and an upright back portion including a sounding board, the combination of a mounting bolt rigidly secured to said piano at said upright back portion, a bracket for said action supported at one end on said mounting bolt and supported at the other end by said key bed, and means on said key bed for supporting the other end of said bracket in a manner such that said bracket is supported in the piano from said mounting bolt and said key bed.

8. In a low upright piano having a keyboard, a key bed therefor rigidly supported in the piano, and an upright back portion, the combination including an action for said piano, and means for supporting said action therein comprising bracket means having one portion at the top and back thereof fixedly mounted on said piano at said upright back portion and another portion at the front thereof extending forwardly therefrom for supporting connection with said key bed, means for mounting said one portion at said upright back portion, and means for securing said other portion of said bracket means to said key bed whereby said bracket means is supported by the upright back portion and the key bed.

9. In an action for a piano having a key with a rear end portion adapted for operative connection with the piano action and said action having a hammer corresponding to the key, the means for operatively connecting the key and hammer including an abstract having a substantially upright body extending entirely to the rear of the rear end portion of the key, said abstract body having a head portion thereon overhanging the key rear end portion, said head portion having an opening therein, and said key rear end portion having a projection thereon fitting into said opening to operatively connect said abstract and key for transmitting movement of the key to the abstract, and with said opening and projection connection acting to center said abstract head portion with reference to said key rear end portion.

10. In an action for a piano having a key with the rear end portion adapted for operative connection with the piano action and said action having a hammer corresponding to the key, the means for operatively connecting the key and hammer including an abstract having a substantially upright body extending entirely to the rear of the rear end portion of the key, said abstract body having a head portion thereon overhanging the key rear end portion, with one of said portions having an opening therein, and the other of said portions having a projection thereon fitting into said opening to operatively connect said abstract and key for transmitting movement of the key to the abstract, and with said opening and projection connection acting to center said abstract head portion with reference to said key rear end portion.

11. In an action for a piano having a key with a rear end portion adapted for operative connection with the piano action and said action having a hammer corresponding to the key, the means for operatively connecting the key and hammer including an abstract having a substantially upright body of such structure and configuration as to lie entirely on the outside of the rear end portion of the key so that the abstract can be connected or disconnected with the key rear end portion without such upright body passing through said key, said abstract having a head portion on the body, and with one of said portions having a projection thereon and the other portion having an opening therein, with the projection fitting into said opening to operatively connected said abstract and key for transmitting movement of the key to the abstract, and with said opening and projection connection acting to center said abstract head portion with reference to said key rear end portion.

12. In an action for a piano having a key with a rear end portion adapted for operative connection with the piano action and said action having a hammer corresponding to the key, the means for operatively connecting the key and hammer including an abstract having a substantially upright body positioned entirely to the rear of the rear end portion of the key, said abstract body having a head portion thereon extending forwardly to overlie the key rear end portion, said head portion having an opening therein, and said key rear end portion having a capstan screw thereon fitting into said opening to operatively connect said abstract and key for transmitting movement of the key to the abstract, and with said captain screw and opening connection acting to center said abstract head portion with reference to said key rear end portion.

13. In an action for a piano having a key with a rear end portion adapted for operative connection with the piano action and said action having a hammer corresponding to the key, the means for operatively connecting the key and hammer, said means having a body extending substantially upright and positioned entirely rearwardly of the rear end of the key, said body having a head portion thereon rigid with respect thereto, overhanging the rear end portion of the key, and spaced vertically from the top surface of the key, with one of said portions having an opening therein, and the other of said portions having projecting means thereon extending into said opening, and a bearing surface portion on said projecting means operatively engageable with said one portion at said opening to transmit the movement of the key to the connecting means.

14. In an action for a piano having a key with a rear end portion adapted for operative connection with the piano action and said action having a hammer corresponding to the key, the means for operatively connecting the key and hammer including an abstract having a body extending downwardly to a point below the level of the key and having a head on the body rigid with respect thereto, with said head having a portion overhanging the rear end portion of the key and spaced vertically from the top surface of the key, with one of said portions having an opening therein and the other of said portions having projecting means thereon extending into said opening, with said projecting means having a bearing surface portion thereon operatively engageable with said one portion, and said bearing surface portion being adjustable relative to said other portion to vary the vertical spacing between the abstract head portion and the top surface of the key.

WILLIAM G. BETZ.